United States Patent
Cao et al.

(10) Patent No.: US 12,511,206 B2
(45) Date of Patent: Dec. 30, 2025

(54) METHOD AND APPARATUS FOR PROCESSING STORAGE MEDIUM FAILURE AND SOLID STATE DRIVE

(71) Applicant: DapuStor Corporation, Shenzhen (CN)

(72) Inventors: Xueming Cao, Shenzhen (CN); Ying Yang, Shenzhen (CN)

(73) Assignee: DAPUSTOR CORPORATION, Shenzhen (CN)

( * ) Notice: Subject to any disclaimer, the term of this patent is extended or adjusted under 35 U.S.C. 154(b) by 0 days.

(21) Appl. No.: 18/677,444

(22) Filed: May 29, 2024

(65) Prior Publication Data

US 2024/0311262 A1    Sep. 19, 2024

Related U.S. Application Data

(63) Continuation of application No. PCT/CN2022/131214, filed on Nov. 10, 2022.

(30) Foreign Application Priority Data

Dec. 28, 2021   (CN) .......................... 202111629175.5

(51) Int. Cl.
    *G06F 11/20*    (2006.01)
    *G06F 11/16*    (2006.01)
(52) U.S. Cl.
    CPC ...... *G06F 11/2094* (2013.01); *G06F 11/1662* (2013.01)

(58) Field of Classification Search
    CPC .......... G06F 11/1662; G06F 11/2094; G06F 2201/805; G06F 3/0619; G06F 3/0647; G11C 29/52
    See application file for complete search history.

(56) References Cited

U.S. PATENT DOCUMENTS

| | | | |
|---|---|---|---|
| 9,640,281 B1 * | 5/2017 | Seo | G11C 29/44 |
| 2014/0189421 A1 | 7/2014 | Werner et al. | |
| 2016/0034206 A1 * | 2/2016 | Ryan | G06F 3/064 |
| | | | 711/103 |
| 2016/0078966 A1 * | 3/2016 | Li | G11C 16/349 |
| | | | 714/723 |
| 2017/0097781 A1 * | 4/2017 | Reimers | G06F 12/0246 |

(Continued)

FOREIGN PATENT DOCUMENTS

| CN | 103713969 A | 4/2014 |
|---|---|---|
| CN | 106502583 A | 3/2017 |

(Continued)

OTHER PUBLICATIONS

International Search Report and Written Opinion in related PCT Application No. PCT/CN2023/131214 dated Feb. 7, 2023 (7 pages).

*Primary Examiner* — Marc Duncan
*Assistant Examiner* — Albert Li
(74) *Attorney, Agent, or Firm* — Bayes PLLC

(57) ABSTRACT

The present disclosure provides a method for processing storage medium failure, an apparatus, and a solid state disk thereof. The method includes: acquiring a failed storage medium; detecting a state of the failed storage medium in real time, where the state at least includes an idle state, an open state, and a closed state; and processing the failed storage medium in real time according to the state of the failed storage medium.

18 Claims, 6 Drawing Sheets

(56) References Cited

U.S. PATENT DOCUMENTS

2017/0168716 A1* 6/2017 Shaharabany ........ G06F 3/0679
2017/0371575 A1* 12/2017 Park .................... G06F 12/0246

FOREIGN PATENT DOCUMENTS

| CN | 109614044 A | 4/2019 |
| CN | 112732181 A | 4/2021 |
| CN | 114281265 A | 4/2022 |
| WO | 2021253983 A1 | 12/2021 |

* cited by examiner

METHOD AND APPARATUS FOR
PROCESSING STORAGE MEDIUM FAILURE
AND SOLID STATE DRIVE

CROSS-REFERENCE TO RELATED
APPLICATIONS

The present application is a continuation of International Application No. PCT/CN2022/131214, filed on Nov. 10, 2022, which claims the benefit of priority to Chinese Patent Application No. 202111629175.5 filed on Dec. 28, 2021. The entire contents of each of the above-referenced applications are expressly incorporated herein by reference.

TECHNICAL FIELD

The present disclosure relates to the field of data storage, and in particular, relates to a method and apparatus for processing storage medium failure and a solid state drive.

BACKGROUND

Solid state drives (SSDs) are hard drives made up of a solid state electronic storage chip array. SSDs comprise control units and storage units (FLASH storage chips or DRAM storage chips). Currently, a substantial portion of SSD systems incorporates dynamic random access memory (DRAM). Therefore, SSDs have a large data cache space for storing data.

In existing technology, problems with the flash memory chips themselves, such as issues during the manufacturing process, wear during use, or issues with the storage controller, can all lead to die failure. If the storage medium fails, performing read, write, and erase operations will result in numerous data errors and may also cause the solid-state drive to crash, thereby reducing the reliability and consistency of the solid-state drive.

SUMMARY

Embodiments of the present disclosure provide a method and apparatus for processing storage medium failure and a solid state drive, and intend to solve the technical problem of low reliability and consistency of data stored in solid state drives in the prior art.

In one aspect, embodiments of the present disclosure provide a method for processing storage medium failure, which is applied to a solid state drive. The method comprises the following steps: acquiring a failed storage medium; detecting a state of the failed storage medium in real time, wherein the state at least comprises an idle state, an open state, and a closed state; and processing the failed storage medium in real time according to the state of the storage medium.

In some embodiments, processing the failed storage medium according to the state of the storage medium comprises: marking the failed storage medium when the failed storage medium is in the idle state; performing a migration operation on stored data in the failed storage medium when the failed storage medium is in the closed state, and marking the migrated failed storage medium; and controlling the failed storage medium to be in a closed state upon the completion of a write operation on the failed storage medium when the failed storage medium is in the open state and the write operation is currently being performed on the failed storage medium, performing the migration operation on the stored data in the failed storage medium, and marking the migrated failed storage medium.

In some embodiments, performing the migration operation on the stored data in the failed storage medium comprises: migrating the stored data in the failed storage medium to a storage medium in an idle state.

In some embodiments, the storage medium comprises a user zone, a system zone, a metadata zone, and a root directory zone, and migrating the stored data in the failed storage medium to the storage medium in the idle state comprises: sequentially migrating the stored data in the root directory zone, the metadata zone, the system zone, and the user zone to the storage medium in the idle state according to an arrangement sequence of the root directory zone, the metadata zone, the system zone, and the user zone.

In some embodiments, the method comprises: controlling the storage medium in the idle state to be updated to the closed state after the data is migrated to the storage medium in the idle state.

In some embodiments, the method comprises: skipping the failed storage medium and not performing read, write, and erase operations when performing read, write, and erase operations after the storage medium is marked as failed.

In another aspect, embodiments of the present disclosure provide an apparatus for processing storage medium failure, which is applied to a solid state drive. The apparatus comprises: an acquiring module, configured to acquire a failed storage medium; a detecting module, configured to detect a state of the failed storage medium in real time, wherein the state at least comprises an idle state, an open state, and a closed state; and a processing module, configured to process the failed storage medium in real time according to the state of the storage medium.

In some embodiments, the processing module comprises: a first marking unit, configured to mark the failed storage medium when the failed storage medium is in the idle state; a first migrating unit, configured to perform a migration operation on stored data in the failed storage medium when the failed storage medium is in the closed state, and mark the migrated failed storage medium; and a second migrating unit, configured to control the failed storage medium to be in the closed state upon the completion of a write operation on the failed storage medium when the failed storage medium is in the open state and the write operation is currently being performed on the failed storage medium, perform the migration operation on the stored data in the failed storage medium, and mark the migrated failed storage medium.

In some embodiments, performing the migration operation on the stored data in the failed storage medium comprises: migrating the stored data in the failed storage medium to a storage medium in an idle state.

In still another aspect, embodiments of the present disclosure provide a solid state drive, comprising: a flash medium; and a main controller, connected to the flash medium. The main controller comprises: at least one processor; and a cache, connected to the at least one processor; wherein the cache stores instructions executable by the at least one processor, and the instructions, when executed by the at least one processor, enable the at least one processor to perform the method for processing storage medium failure as described above.

Different from the situation of the related art, the embodiments of the present disclosure provide a method and apparatus for processing storage medium failure and a solid state drive. The method and apparatus are applied to the solid state drive. The method and apparatus for processing storage medium failure and the solid state drive involve acquiring a failed storage medium; then detecting a state of the failed storage medium in real time, wherein the state at least comprises an idle state, an open state, and a closed state; and finally processing the failed storage medium in real time according to the state of the storage medium. In the embodiments of the present disclosure, the data in the failed storage medium is prevented from being lost by performing different operations on the storage media in different states, and thus the reliability and consistency of the data stored in the solid state drive are improved.

DESCRIPTION OF DRAWINGS

One or more embodiments are exemplified through the corresponding accompanying drawings. These exemplary illustrations do not impose limitations on the embodiments. Elements in the accompanying drawings with the same reference number are indicated to be similar elements, unless specifically stated otherwise. The images in the accompanying drawings are not to be construed as limiting in scale.

DETAILED DESCRIPTION

Figure 1:
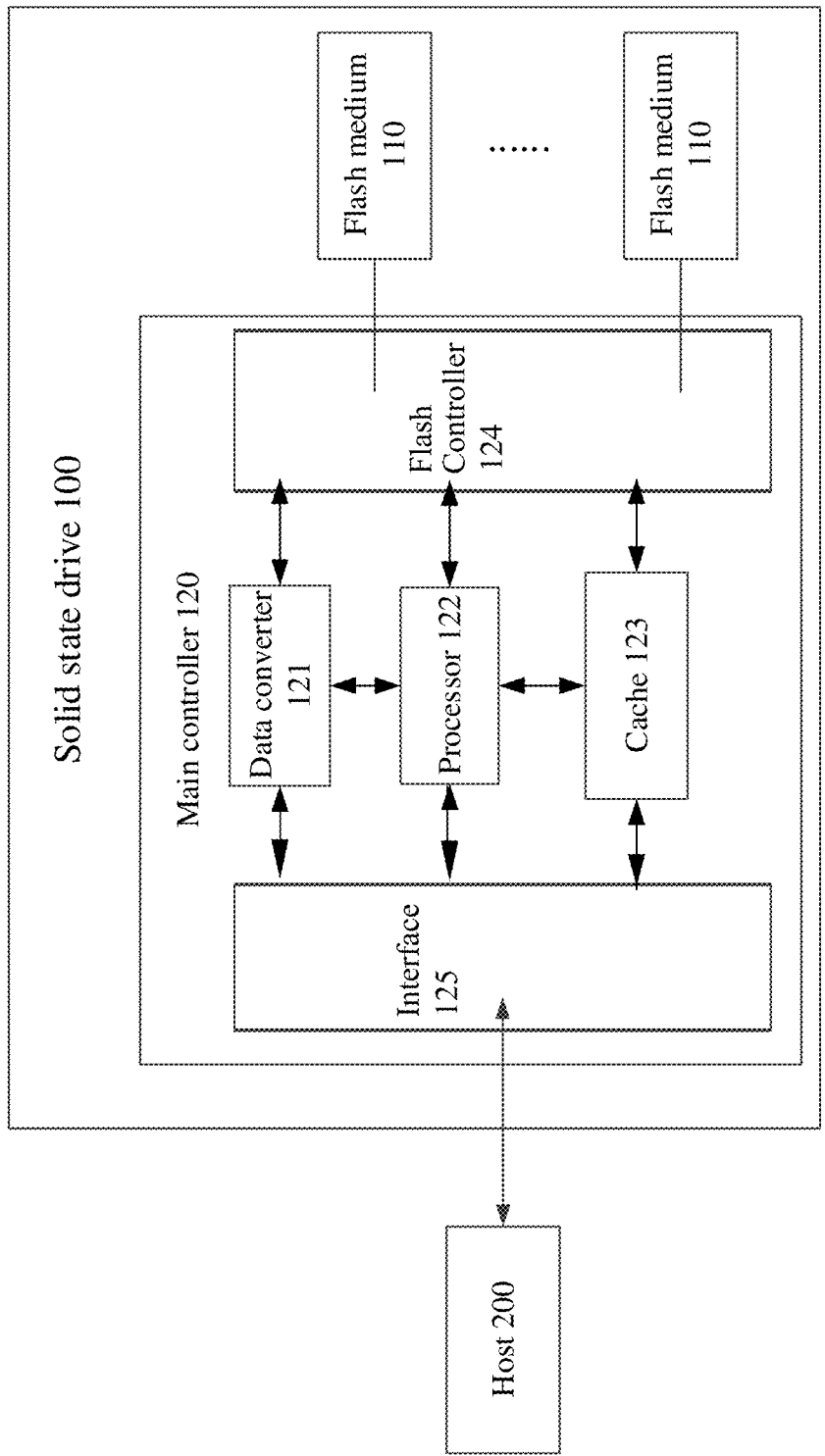
FIG. 1 is a schematic structural diagram of a solid state drive disclosed according to the embodiments of the present disclosure.

In order to make the objectives, technical solutions, and advantages of the present disclosure clearer, the present disclosure is further described in detail below with reference to the accompanying drawings and embodiments. It should be understood that the specific embodiments described herein are merely illustrative of the present disclosure and are not intended to limit the present disclosure.

It should be noted that, if not in conflict, various features in the embodiments of the present disclosure may be combined with each other, and are within the protection scope of the present disclosure. In addition, although a division of functional modules is made in the apparatus schematic diagrams, and a logical order is shown in the flowchart, in certain cases, the steps shown or described may be performed by a different division of modules than that in the apparatus schematic diagrams, or in a different order than that in the flowchart.

Unless otherwise defined, all technical and scientific terms used herein have the same meaning as commonly understood by those of ordinary skill in the art to which the present disclosure belongs. The terms used in the description of the present disclosure are for the purpose of describing specific embodiments only and are not intended to limit the present disclosure. As used herein, the term "and/or" includes any and all combinations of one or more of the associated listed items.

Typical solid state drives (SSDs) usually comprise a solid state drive controller (main controller), flash array, cache module, and other peripheral modules.

The solid state drive controller serves as the control processing module, managing the internal system of the SSD. The flash array (NAND Flash), serving as the storage module, is configured to store data which includes user data and system data. The flash array generally has multiple channels (CH), with each channel independently connecting a set of NAND Flash, such as $CH_0/CH_1 \ldots CH_x$. Flash memory (NAND Flash), as a characteristic, requires erasure before writing, and cannot be overwritten, and each flash memory has a limited number of erase cycles. The cache module is configured to cache mapping tables and is generally a dynamic random access memory (DRAM). Other peripheral modules may comprise sensors, registers, and other components.

Flash memory (NAND Flash) is a non-volatile storage medium, and is characterized in that electrons can be stored in one unit. The number of the stored electrons can be represented as a voltage value, and the voltage value can be divided into a plurality of regions. If two regions are divided, it represents that only one bit is stored (such flash is called SLC), if four regions are divided, it represents that 2 bits are stored (such flash is called MLC), if eight regions are divided, it represents that 3 bits are stored (such flash is called TLC), and the like, the power of 2 is taken as the number of the stored bits to determine the number of the distributed regions.

After data is written, the number of stored electrons can be represented as a voltage value, and the determination of the read value depends on the comparison between the voltage value of the unit and a reference voltage (or threshold voltage).

A storage medium die (also referred to as LUN) comprises several flash planes, each flash plane comprises several flash blocks, and each block comprises several pages. The storage medium die/LUN refers to a basic unit that receives and executes a flash command, and the storage medium die/LUN can execute only one command at a time.

Referring to FIG. 1, FIG. 1 is a schematic structural diagram of a solid state drive disclosed according to the embodiments of the present disclosure. As shown in FIG. 1, the solid state drive 100 comprises a flash medium 110 and a main controller 120 connected to the flash medium. The solid state drive 100 is in communication connection with the host 200 through wired or wireless means to achieve data exchange.

The flash medium 110, serving as the storage medium of the solid state drive 100, is also known as flash memory, flash, flash storage, or flash memory chip. It belongs to a type of memory device and is a non-volatile memory that can retain data for extended periods even without a power supply. The storage characteristics of the flash medium 110 are similar to hard drives, making it the foundation of the storage medium in various portable digital devices.

The main controller 120 comprises a data converter 121, a processor 122, a cache 123, a flash controller 124, and an interface 125.

The data converter 121 is connected to both the processor 122 and the flash controller 124. The data converter 121 is configured to convert binary data to hexadecimal data and vice versa. The data converter 121 may comprise a binary data register and a hexadecimal data register. The binary data register may be configured to store data converted from hexadecimal to binary, and the hexadecimal data register may be configured to store data converted from binary to hexadecimal.

The processor 122 is connected to the data converter 121, the cache 123, the flash controller 124, and the interface 125, respectively. The processor 122 can be connected to the data converter 121, the cache 123, the flash controller 124, and the interface 125 through a bus or other means. The processor is configured to run non-volatile software programs, instructions, and modules stored in the cache 123 to implement any one of the method embodiments in the present disclosure.

The cache 123 is configured primarily to cache read/write instructions sent by the host 200 and the read or write data obtained from the flash medium 110 based on the read/write instructions sent by the host 200. The cache 123, serving as a non-volatile computer-readable storage medium, can be configured to store non-volatile software programs, non-volatile computer-executable programs, and modules. The cache 123 may comprise a program storage area where an operating system and at least one application needed for functionality can be stored. Furthermore, the cache 123 may comprise a high-speed random access memory, and may further comprise a non-volatile memory, such as at least one magnetic disk memory device, flash memory device, or other non-volatile solid state memory device. In some embodiments, the cache 123 comprises a memory that is remotely configured relative to the processor 122. Examples of the above network include, but are not limited to, the Internet, intranets, local area networks, mobile communication networks, and combinations thereof.

The flash controller 124 is connected to the flash medium 110, the data converter 121, the processor 122, and the cache 123. The flash controller is configured to access the back-end flash medium 110 and manage various parameters and data I/O of the flash medium 110; or to provide access interfaces and protocols, implement the corresponding SAS/SATA target protocol end or NVMe protocol end, obtain I/O instructions sent by the host 200, and decode and generate internal private data results for execution; or to be responsible for the core processing of flash translation layer (FTL).

The interface 125 is connected to the host 200, the data converter 121, the processor 122, and the cache 123. The interface is configured to receive data sent by the host 200 or data sent by the processor 122, implementing data transmission between the host 200 and the processor 122. The interface 125 may be in the form of SATA-2 interface, SATA-3 interface, SAS interface, MSATA interface, PCI-E interface, NGFF interface, CFast interface, SFF-8639 interface, and M.2 NVME/SATA protocols.

Figure 2:
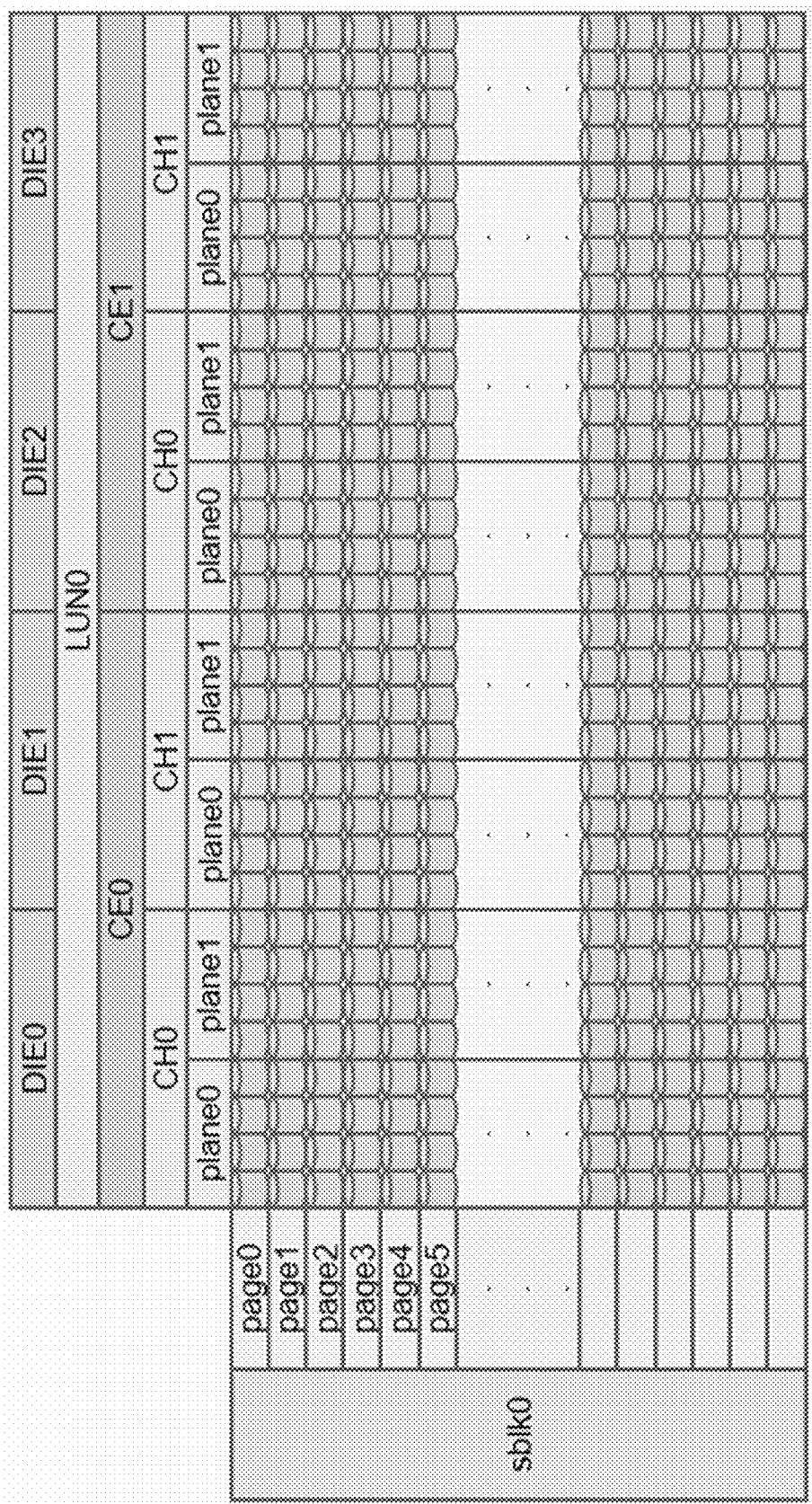
FIG. 2 is a schematic diagram of a logic layout of a flash medium disclosed according to the embodiments of the present disclosure.

Referring to FIG. 2, FIG. 2 is a schematic diagram of a logic layout of a flash medium disclosed according to the embodiments of the present disclosure. Since for a storage medium, read, write, and erase operation instructions are sent by a flash translation layer (FTL), the storage medium is abstractly divided according to the flash translation layer. As shown in FIG. 2, the storage medium is horizontally divided into super blocks and flash pages, and is vertically divided into storage medium dies, an LUN, CEs, CHs, and planes, where the CEs refer to specific connection pins between the flash controller and the storage medium, and the CEs refer to enable signal terminals. By abstract division of the flash medium, all channels in the flash medium can execute commands in parallel, and thus internal algorithms of the flash medium are controlled conveniently.

In some embodiments, there are two enable signal terminals (CE0 and CE1) at the bottom of the vertical division. The two enable signal terminals are respectively connected to two channels (CH0 and CH1). Each channel corresponds to a storage medium die. There is one LUN unit within four storage medium dies, and each storage medium die comprises two flash planes. The storage medium dies on each channel can operate in parallel, and the number of storage medium dies on the channel can be determined according to the capacity and performance requirements of the solid state drive. The more the storage medium dies there are, the greater the number of concurrent operations, indicating a better performance of the solid state drive. In the case of horizontal division, the flash medium can be divided into several super blocks. Each super block comprises several flash pages. The write and erase of the flash medium are processed by taking the super blocks as operating units, read of the flash medium is processed by taking a single flash page as a minimum unit. The minimum unit of the flash page is 4 k, namely, the unit of each flash plane is 16 k. In some embodiments, in the abstract division, as viewed from the vertical division, the storage medium die comprises several super blocks, and as viewed from the horizontal division, the super blocks comprise several storage medium dies.

Figure 3:
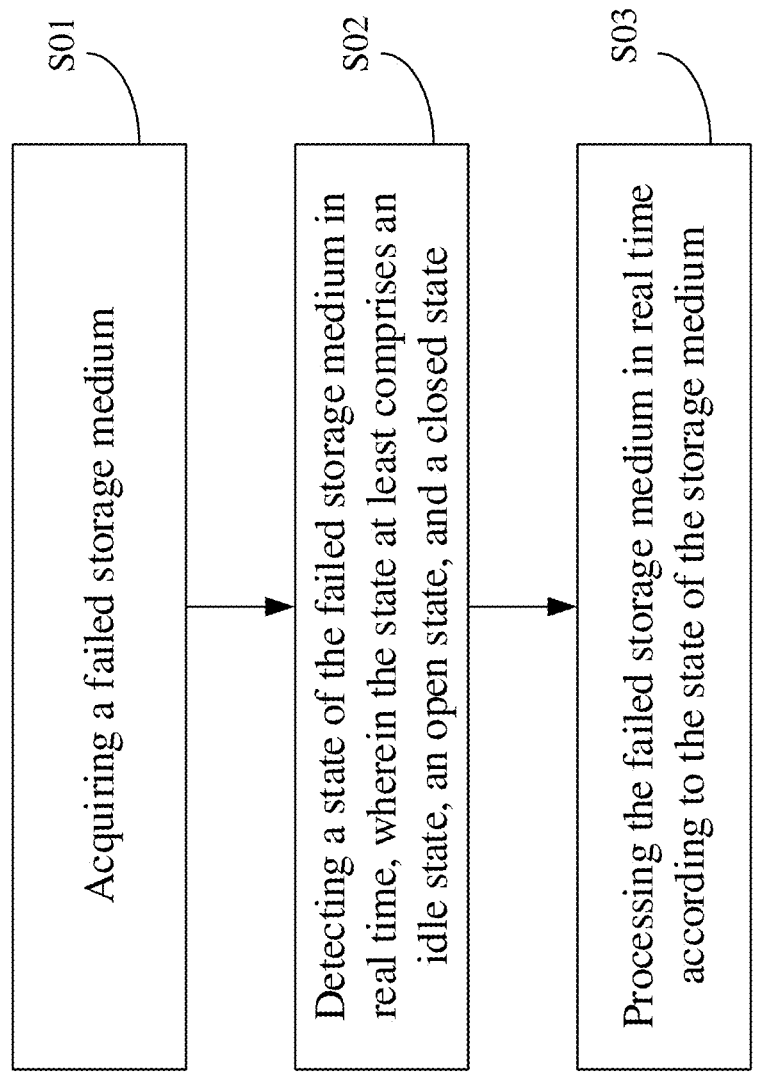
FIG. 3 is a flowchart of a method for processing storage medium failure disclosed according to the embodiments of the present disclosure.

Referring to FIG. 3, FIG. 3 is a method for processing storage medium failure disclosed according to the embodiments of the present disclosure, which is applied to the solid state drive as described above. The method includes the following steps:

In S01, a failed storage medium is acquired.

Failures of the storage medium include read errors (which include physical location misreads, data read errors, and data unreadable), write errors, and erase errors.

In some embodiments, the number of errors in the read operation, the write operation, and the erase operation of the storage medium is acquired. In the case that the number of errors in at least one of the read operation, the write operation, and the erase operation exceeds a first preset error threshold, failure diagnosis of the storage medium is triggered; in the failure diagnosis, in the case that the number of errors in the flash page exceeds a second preset error threshold, it is determined that the super block is in an error, and in the case that the number of errors in the super block exceeds a third preset error threshold, it is determined that the storage medium fails.

In S02, the state of the failed storage medium is detected in real time, and the state at least comprises an idle state, an open state, and a closed state.

The idle state of the storage medium refers to a current condition where no data is stored in the storage medium; the open state refers to a current condition where the storage medium is in the process of performing a write operation; and the closed state refers to a current condition where data has already been written to the storage medium. When a write operation is performed on data, a storage medium in the idle state is firstly acquired, then the storage medium in the idle state is converted into a storage medium in an open state, and a write operation is performed on the storage medium in the open state, and thus the storage medium is converted from the open state into the closed state after the data is written into the storage medium in the open state.

In some embodiments, the failed storage medium further includes, but is not limited to, a moving state, a diagnostic state, a bad state, and an invalid state.

In S03, the failed storage medium is processed in real time according to the state of the storage medium.

In some embodiments, marking the failed storage medium when the failed storage medium is in the idle state; performing a migration operation on the stored data in the failed storage medium when the failed storage medium is in the closed state, and marking the migrated failed storage medium; and controlling the failed storage medium to be in the closed state upon the completion of a write operation on the failed storage medium when the failed storage medium is in the open state and the write operation is currently being performed on the failed storage medium, performing the migration operation on the stored data in the failed storage medium, and marking the migrated failed storage medium. Performing the migration operation on the stored data in the failed storage medium refers to migrating the stored data in the failed storage medium into a storage medium in an idle state, and controlling the storage medium in the idle state to be updated to the closed state after the data is migrated to the storage medium in the idle state.

In some embodiments, the failed storage medium is detected, and in the case that no data is stored in the failed storage medium, that is, the storage medium is in an idle state, the failed storage medium is directly marked as a failed storage medium.

In the case that the failed storage medium is the storage medium in the closed state, the data stored in the storage medium in the closed state is migrated to a super block in an idle state. In some embodiments, when a migration operation is performed on the data, a storage medium in a first closed state that needs to have its data migrated is first acquired, and then a storage medium in a first idle state is acquired, and the storage medium in the first idle state is converted into a storage medium in an open state, then the data in the storage medium in the first closed state is migrated to the storage medium in the open state, and finally, the storage medium in the open state after migration is converted into a storage medium in a second closed state, and the storage medium in the first closed state is converted into a storage medium in a second idle state. The storage medium in the second idle state is marked as the failed storage medium, and the storage medium in the second idle state is migrated to the front of the storage medium in the second closed state, so as to avoid errors in the performance of read operation, write operation, and erase operation next time.

In the case that the failed storage medium is currently performing a write operation, that is, the failed storage medium is in the open state, then wait for the completion of the write operation of the storage medium in the open state. After the completion of the write operation, the storage medium in the open state is converted into the closed state, and finally, an operation is performed on the storage medium in the closed state, so that no data exists in the failed storage medium, and the reliability of data stored in the solid state drive is improved.

Figure 4:
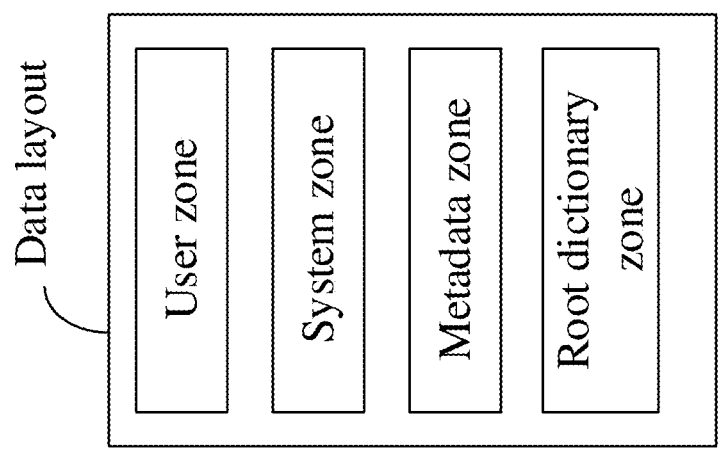
FIG. 4 is a schematic diagram of the state of a solid state drive after the failure of a storage medium disclosed according to the embodiments of the present disclosure.

Referring to FIG. 4, FIG. 4 is a schematic diagram of the state of a solid state drive after the failure of a storage medium disclosed according to the embodiments of the present disclosure. In this embodiment, the failed storage medium refers to that the number of errors in flash blocks in the storage medium is greater than or equal to a preset threshold, and optionally, most of the flash blocks in the storage medium are in an error state. As shown in FIG. 4, the "normal" refers to a minimum unit in a normal state, the "fail" refers to a minimum unit in a failed state, and DIE1 and DIE3 in the solid state drive belong to a failed storage medium.

In some embodiments, in the case that the storage medium is marked as a failed storage medium, the solid state drive skips the failed storage medium and does not perform read, write, and erase operations on the failed storage medium when performing read, write, and erase operations next time.

In some embodiments, the storage medium includes a user zone, a system zone, a metadata zone, and a root directory zone, and the stored data in the root directory zone, the metadata zone, the system zone, and the user zone are sequentially migrated to a storage medium in an idle state according to the arrangement sequence of the root directory zone, the metadata zone, the system zone, and the user zone.

Figure 5:
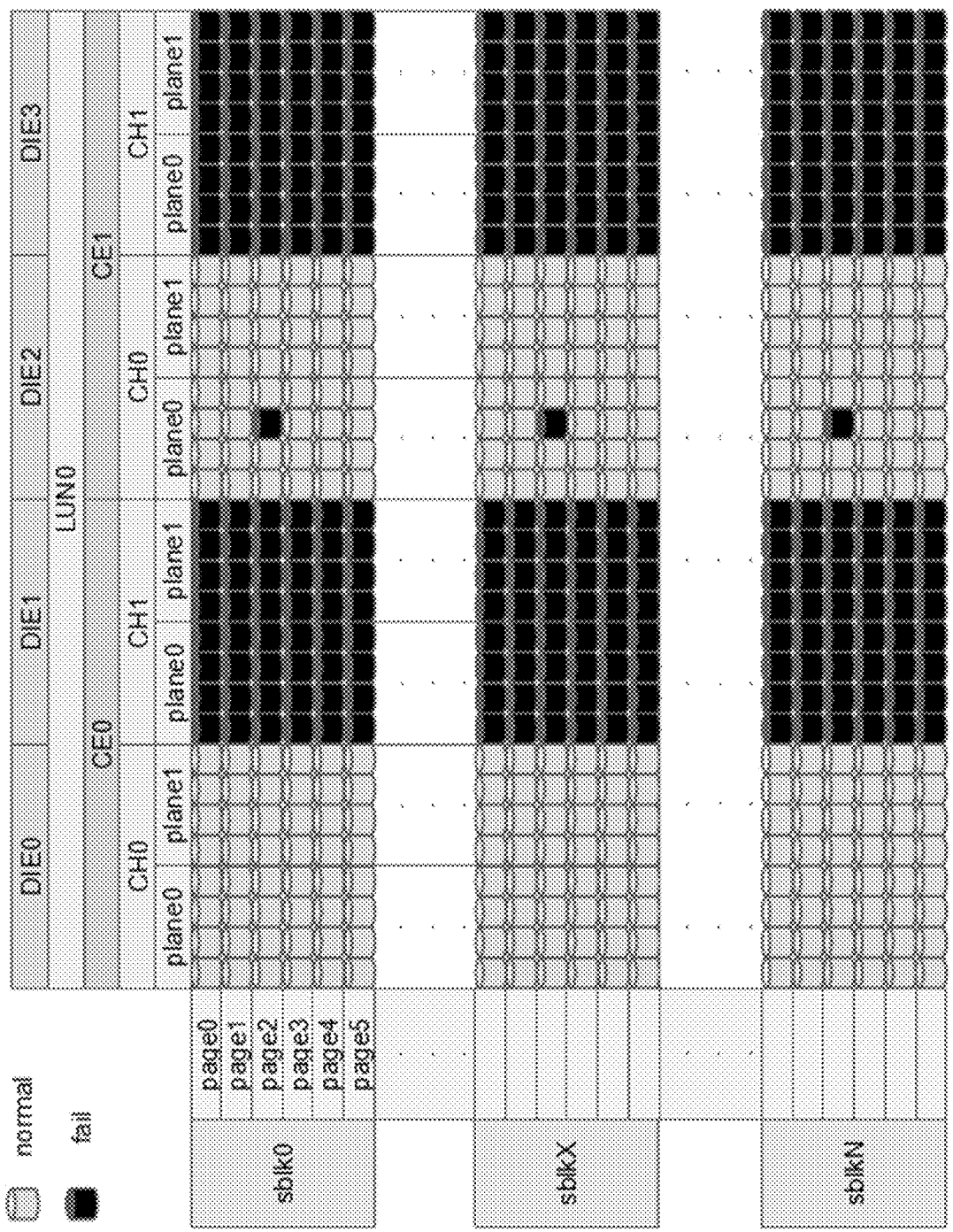
FIG. 5 is a schematic diagram illustrating the management of data during migration of a failed storage medium disclosed according to the embodiments of the present disclosure.

Referring to FIG. 5, FIG. 5 is a schematic diagram illustrating the management of data during migration of a failed storage medium disclosed according to the embodiments of the present disclosure. The user zone is mainly configured to store user data, the system zone (sys zone) is configured to store management data based on the user zone, the metadata zone (meta zone) is configured to store management data based on the system zone, and the root directory zone is configured to store management structures related to booting, bad block tables, and basic configurations of each module, etc.

In some embodiments, during the migration of the data, the storage medium in the closed state in the failed storage medium is first acquired, the storage medium in the idle state is acquired, and then the data in the storage medium in the closed state is migrated to the storage medium in the idle state according to the migrating sequence. The migrating sequence is from the root directory zone, the metadata zone, the system zone, to the user zone, and the region where the stored data in the storage medium after migration is located corresponds to the region where the stored data in the storage medium before migration is located in a one-to-one manner, that is, if the stored data before migration is stored in the root directory zone, the stored data after migration requires to be also stored in the root directory zone.

The embodiments of the present disclosure provide a method for processing storage medium failure, which is applied to a solid state drive. The method for processing storage medium failure involves acquiring a failed storage medium; then detecting a state of the failed storage medium in real time, wherein the state at least comprises an idle state, an open state, and a closed state; and finally processing the failed storage medium in real time according to the state of the storage medium. According to the method, the data stored in the failed storage medium is prevented from being lost by performing different operations on the storage media in different states, and thus the reliability and consistency of the data stored in the solid state drive are improved.

Figure 6:
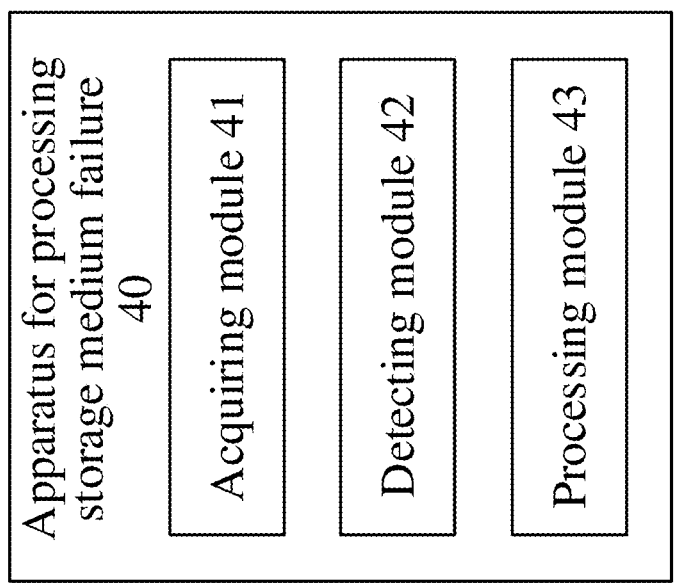
FIG. 6 is a schematic structural diagram of the hardware of an electronic device for performing the aforementioned method disclosed according to the embodiments of the present disclosure.

Referring to FIG. 6, FIG. 6 is a structural block diagram of an apparatus for processing storage medium failure disclosed according to the embodiments of the present disclosure. As shown in FIG. 6, the apparatus for processing storage medium failure 40 comprises an acquiring module 41, a detecting module 42, and a processing module 43.

The acquiring module 41 is configured to acquire a failed storage medium.

The detecting module 42 is configured to detect a state of the failed storage medium in real time, wherein the state at least comprises an idle state, an open state, and a closed state.

The processing module 43 is configured to process the failed storage medium in real time according to the state of the storage medium.

The processing module 43 comprises a first marking unit 431, a first migrating unit 432, and a second migrating unit 433.

The first marking unit 431 is configured to mark the failed storage medium when the failed storage medium is in the idle state.

The first migrating unit 432 is configured to perform a migration operation on stored data in the failed storage medium when the failed storage medium is in the closed state, and mark the migrated failed storage medium.

The second migrating unit 433 is configured to control the failed storage medium to be in a closed state upon the completion of a write operation on the failed storage medium when the failed storage medium is in the open state and the write operation is currently being performed on the failed storage medium, perform the migration operation on the stored data in the failed storage medium, and mark the migrated failed storage medium.

Performing the migration operation on the stored data in the failed storage medium comprises: migrating the stored data in the failed storage medium to a storage medium in an idle state.

It should be noted that the aforementioned apparatus for processing storage medium failure may perform the method for processing storage medium failure provided in the embodiments of the present disclosure, and it possesses corresponding functional modules and beneficial effects for performing the method. Technical details that are not described in detail in the embodiment of the apparatus for processing storage medium failure can be referred to the method for processing storage medium failure provided in the embodiments of the present disclosure.

The apparatus embodiment described above is merely illustrative, wherein the units described as separate components may or may not be physically separated, and components displayed as units may or may not be physical units; i.e., they may be located in one position, or may be distributed on multiple network units. Some or all of the modules can be selected according to actual needs to achieve the purpose of the solutions of the embodiments.

From the descriptions of the above embodiments, those of ordinary skill in the art can clearly understand that various embodiments can be implemented through a software and general hardware platform or through hardware alone. Those of ordinary skill in the art can understand that all or part of the processes in the methods of the embodiments described above can be implemented by instructing relevant hardware through a computer program. The program can be stored in a computer-readable storage medium, and when executed, the program can include the processes of the embodiments of the methods as described above. The storage medium may be a magnetic disk, an optical disk, a read-only memory (ROM), or a random access memory (RAM), etc.

Finally, it should be noted that the above embodiments are only intended to illustrate the technical solutions of the present disclosure and are not intended to limit them. Under the concept of the present disclosure, the technical features in the above embodiments or different embodiments can also be combined, steps can be implemented in any order, and there may exist many other variations in different aspects of the present disclosure as described above, which are not provided in detail for the sake of brevity. Despite the detailed description of the present disclosure with reference to the previous embodiments, those of ordinary skill in the art should understand that the technical solutions recorded in the various foregoing embodiments can still be modified or some of the technical features therein can be replaced with equivalent alternatives. Such modifications or replacements do not make the essence of the respective technical solutions depart from the scope of the technical solutions of various embodiments of the present disclosure.

The invention claimed is:

1. A method for processing storage medium failure, wherein the method is applied to a solid state drive and comprises:
  acquiring a failed storage medium;
  detecting a state of the failed storage medium in real time, wherein the state at least comprises an idle state, an open state, or a closed state; and
  processing the failed storage medium in real time according to the state of the failed storage medium, comprising:
    when the failed storage medium is in the open state and a write operation is currently being performed on the failed storage medium, controlling the failed storage medium to be in the closed state upon completion of the write operation on the failed storage medium, performing a migration operation on stored data in the failed storage medium, and marking the failed storage medium after performing the migration operation.

2. The method according to claim 1, wherein processing the failed storage medium in real time according to the state of the failed storage medium further comprises:
  marking the failed storage medium when the failed storage medium is in the idle state; and
  performing the migration operation on the stored data in the failed storage medium when the failed storage medium is in the closed state, and marking the failed storage medium after performing the migration operation.

3. The method according to claim 2, wherein performing the migration operation on the stored data in the failed storage medium comprises:
  migrating the stored data in the failed storage medium to a storage medium in the idle state.

4. The method according to claim 3, wherein each of the failed storage medium and the storage medium in the idle state comprises a user zone, a system zone, a metadata zone, and a root directory zone,
  wherein migrating the stored data in the failed storage medium to the storage medium in the idle state comprises:
  sequentially migrating the stored data in the root directory zone, the metadata zone, the system zone, and the user zone to the storage medium in the idle state according to an arrangement sequence of the root directory zone, the metadata zone, the system zone, and the user zone.

5. The method according to claim 4, further comprising:
  controlling the storage medium in the idle state to be updated to the closed state after the stored data in the failed storage medium is migrated to the storage medium in the idle state.

6. The method according to claim 5, further comprising:
  skipping the failed storage medium and not performing read, write, and erase operations when performing read, write, and erase operations after the failed storage medium is marked as failed.

7. An apparatus for processing storage medium failure, comprising:
  at least one processor; and a memory connected to the at least one processor and storing instructions, when executed by the at least one processor, cause the at least one processor to perform operations comprising:
    acquiring a failed storage medium;
    detecting a state of the failed storage medium in real time, wherein the state at least comprises an idle state, an open state, or a closed state; and
    processing the failed storage medium in real time according to the state of the failed storage medium, comprising:
        when the failed storage medium is in the open state and a write operation is currently being performed on the failed storage medium, controlling the failed storage medium to be in the closed state upon completion of the write operation on the failed storage medium, performing a migration operation on stored data in the failed storage medium, and marking the failed storage medium after performing the migration operation.

8. The apparatus according to claim 7, wherein processing the failed storage medium in real time according to the state of the failed storage medium further comprises:
    marking the failed storage medium when the failed storage medium is in the idle state; and
    performing the migration operation on the stored data in the failed storage medium when the failed storage medium is in the closed state, and mark the migrated failed storage medium after performing the migration operation.

9. The apparatus according to claim 8, wherein performing the migration operation on the stored data in the failed storage medium comprises:
    migrating the stored data in the failed storage medium to a storage medium in the idle state.

10. The apparatus according to claim 9, wherein each of the failed storage medium and the storage medium in the idle state comprises a user zone, a system zone, a metadata zone, and a root directory zone,
    wherein migrating the stored data in the failed storage medium to the storage medium in the idle state comprises:
    sequentially migrating the stored data in the root directory zone, the metadata zone, the system zone, and the user zone to the storage medium in the idle state according to an arrangement sequence of the root directory zone, the metadata zone, the system zone, and the user zone.

11. The apparatus according to claim 10, wherein after the stored data is migrated to the storage medium in the idle state, the operations further comprise:
    controlling the storage medium in the idle state to be updated to the closed state.

12. The apparatus according to claim 11, wherein after the failed storage medium is marked as failed, the operations further comprise:
    skipping the failed storage medium and not performing read, write, and erase operations when performing read, write, and erase operations.

13. A solid state drive, comprising:
a flash medium; and
a main controller connected to the flash medium;
wherein the main controller comprises:
    at least one processor; and
    a cache connected to the at least one processor;
    wherein the cache stores instructions executable by the at least one processor to perform operations comprising:
        acquiring a failed storage medium;
        detecting a state of the failed storage medium in real time, wherein the state at least comprises an idle state, an open state, or a closed state; and
        processing the failed storage medium in real time according to the state of the failed storage medium, comprising:
            when the failed storage medium is in the open state and a write operation is currently being performed on the failed storage medium, controlling the failed storage medium to be in the closed state upon completion of the write operation on the failed storage medium, performing a migration operation on stored data in the failed storage medium, and marking the failed storage medium after performing the migration operation.

14. The solid state drive according to claim 13, wherein processing the failed storage medium in real time according to the state of the failed storage medium further comprises:
    marking the failed storage medium when the failed storage medium is in the idle state; and
    performing the migration operation on the stored data in the failed storage medium when the failed storage medium is in the closed state, and marking the failed storage medium after performing the migration operation.

15. The solid state drive according to claim 14, performing the migration operation on the stored data in the failed storage medium comprises:
    migrating the stored data in the failed storage medium to a storage medium in the idle state.

16. The solid state drive according to claim 15, wherein each of the failed storage medium and the storage medium in the idle state comprises a user zone, a system zone, a metadata zone, and a root directory zone,
    wherein migrating the stored data in the failed storage medium to the storage medium in the idle state comprises:
    sequentially migrating the stored data in the root directory zone, the metadata zone, the system zone, and the user zone to the storage medium in the idle state according to an arrangement sequence of the root directory zone, the metadata zone, the system zone, and the user zone.

17. The solid state drive according to claim 16, wherein the operations further comprise:
    controlling the storage medium in the idle state to be updated to the closed state after the stored data in the failed storage medium is migrated to the storage medium in the idle state.

18. The solid state drive according to claim 17, wherein the operations further comprise:
    skipping the failed storage medium and not performing read, write, and erase operations when performing read, write, and erase operations after the failed storage medium is marked as failed.

\* \* \* \* \*